Jan. 2, 1962 P. B. MYERS 3,015,809

MAGNETIC MEMORY MATRIX

Filed June 19, 1959 2 Sheets-Sheet 1

INVENTOR
P. B. MYERS
BY William H. Kamstra
ATTORNEY

Jan. 2, 1962 P. B. MYERS 3,015,809

MAGNETIC MEMORY MATRIX

Filed June 19, 1959 2 Sheets-Sheet 2

INVENTOR
P. B. MYERS
BY William H. Hamstra
ATTORNEY 3,015,809
Patented Jan. 2, 1962

3,015,809

MAGNETIC MEMORY MATRIX

Peter B. Myers, Millington, N.J., assignor to Bell Telephone Laboratories, Incorporated, New York, N.Y., a corporation of New York Filed June 19, 1959, Ser. No. 821,430
15 Claims. (Cl. 340—174)

Figure 1:
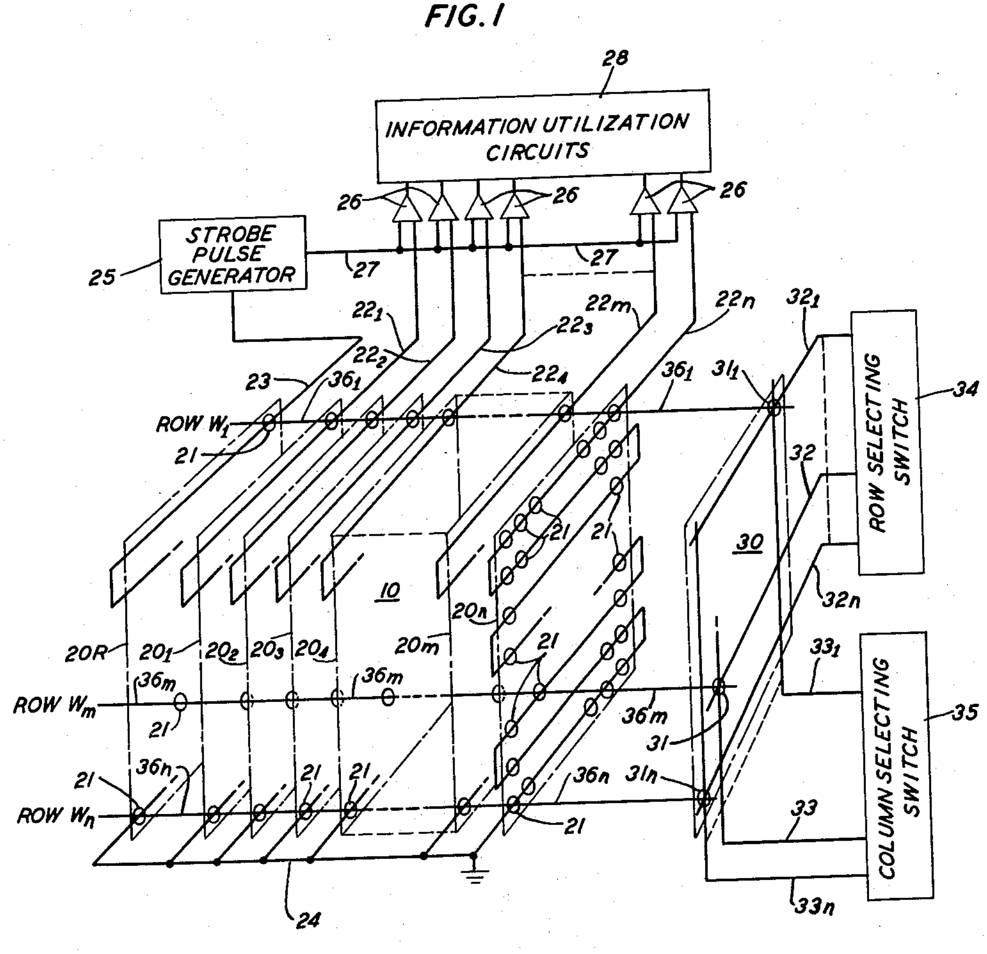

This invention relates to information storage systems and particularly to improvements in the means for reading out specific information stored in such systems.

Information storage memories capable of storing a large number of information bits are well-known in data processing and information handling art. Such present day memories frequently employed as basic storage cells a magnetic element which is capable of storing a particular bit of information in the form of a representative remanent magnetic state. Square loop toroidal cores, magnetic memory wires, and the like, have proven highly advantageous as two-state devices for containing binary information values. As generally employed, the basic storage elements are arranged in coordinate arrays to present a storage matrix, and such a matrix may be comprised of a single plane of coordinately arranged elements or the matrix may comprise a plurality of such planes in a three-dimensional configuration. A single plane memory matrix of the character contemplated herein is shown, for example, in the copending application of A. H. Bobeck, Serial No. 616,308, filed October 16, 1956, now Patent No. 2,951,240. In the exemplary array there shown, a plurality of magnetic storage cores are arranged in a coordinate array and, in the case there shown, the matrix is constituted on the well-known word-organized basis. The cores of each row thus are adapted to contain respectively the information bits making up a word of binary information. An entire word may be read out of a row of such an array by an interrogating current pulse applied to a row conductor threading each core of a row. Signals induced by the switching of particular cores of a row as a result of the applied interrogating current appear on column sensing conductors threading the cores of the columns, respectively. The signals are thus simultaneously made available as representative of the information bits of a word read out. Each column sensing conductor, in threading the cores of a column containing corresponding bits of the rows of words, thus acts as a common conductor for the same corresponding bit of each row.

A coordinate array core matrix may also be organized on an individual bit address basis. In such an arrangement a particular bit address is interrogated by applying coincident interrogating current pulses to selected coordinate switching conductors defining the particular bit address. A single sensing conductor is generally threaded through every core of the array in series. Since only a single bit address of the array is interrogated at any one time such a common sensing conductor advantageously serves to make available the signals read out of any bit address, the address source of the information read-out signal being determined by the particular coordinate switching conductors selected for interrogation.

The organization of the sensing conductors described in the foregoing for a word-organized memory matrix and for a matrix organized on an individual bit address basis are frequently combined in a three-dimensional matrix configuration to achieve a saving in the number of sensing conductors required. In a three-dimensional word-organized matrix the corresponding cores of the coordinate core planes make up the individual bit addresses of the binary words stored. It is apparent from such an organization that when a particular word is being read out only a single address of each coordinately arranged core plane making up the matrix is interrogated. As a result, a single sensing conductor may be used to serially thread all of the cores of a particular plane. Read-out signals representative of the information bits of a word being read out then will appear on the sensing conductors respectively threading the cores of the planes.

In the three-dimensional matrix arrangement just described it is clear that, in terms of the physical distribution of cores along a sensing conductor of a coordinate array core plane, the cores will be arranged in a progressively increasing distance from an output terminal of the sensing conductor. In small memories the difference in distance between the cores from an output point of the threading sensing conductors is of relatively little consequence. However, in the employment of information storage memories generally, the tendency is to a demand for memories of ever increasing capacities. Thus, magnetic memories having a storage capacity in excess of a million words are known and are in general use in information handling systems. In such large capacity magnetic memories the physical location of a storage element along an energizing conductor may become a serious consideration in terms of the propagation time of electrical signals through the memory. Thus in large capacity memories time must be allowed for the interrogating current pulse to reach a desired address as well as for the output signal, if any, to traverse a sensing conductor in finding its way out of the matrix. In any core memory, even assuming the most favorable propagation velocity of electrical signals through the memory, a signal would require one millimicrosecond for every twelve inches of sensing conductor. Assuming a reasonable threading in the memory of ten cores per lineal inch, the minimum time that would be required for an information bit stored in the most inaccessible word address of the memory to reach output circuitry would be ten microseconds for a million word capacity memory. This problem is aggravated by the fact that this delay in a million word memory will vary between zero and ten microseconds depending upon where along the sensing conductor a particular information bit is stored.

In the magnetic memory arrays in connection with which the present invention may be advantageously described, read out is accomplished for each information bit by applying a switching magnetomotive force to a square loop core. If the core is in a particular information representative magnetic state, the core will be caused to switch and to thereby generate a read-out signal in the threading sensing conductor. When well-known coincident current word address selection and interrogation techniques are employed, cores in unselected rows may be caused partially to switch as the result of an application of less than all of the coincident currents necessary to cause a complete switching. This partial switching of a core induces a spurious noise signal on the threading sensing conductor which resembles in amplitude and waveshape the initial spike portion of a true read-out signal resulting from a complete switching of a selected core and which true read-out signal is usually held indicative of a binary "1." In addition, a true binary "0" output signal also manifests the same spike. Accordingly, means are required in many magnetic memory output circuit arrangements for discriminating between true, information representative read-out signals and spurious, incidentally generated ones.

One means for achieving this discrimination which is employed in connection with moderate capacity memories comprises the strobing of the read-out signal some time after the passage of the initial spike. In the following microsecond or so in which a square loop element is completely switched, the read-out signal first builds up and then collapses. Accordingly, strobing at substantially half way through the switching time provides the most advantageous signal-to-noise ratio. In very large scale magnetic memories, however, such a strobing operation would present a serious problem of proper timing in view of the difficulty in predicting the precise point within the possible delay period mentioned above at which a read-out signal is likely to occur.

In many large scale memories before a read-out signal may be effectively subjected to a detection strobing operation, it must first be raised to a usable power level. Accordingly, in such a case each of the plane sensing conductors of a three-dimensional matrix is terminated in a detection amplifier where the read-out signal is amplified. Strobing of the signals may then be accomplished in any known manner such as, for example, by means of a strobing signal applied to a plurality of AND gates to which the amplified read-out signals are also applied.

It is an object of this invention to accommodate external detection circuits to variations in the appearance times of read-out signals in information storage memories.

Another object of this invention is to synchronize read-out signals representative of stored information with a strobing signal in information storage systems.

A further object of this invention is to provide a new and novel read-out detection circuit for magnetic information memories.

Yet another object of this invention is to accomplish the strobing of read-out signals representative of stored information at the same time that the read-out signals are raised to usable levels in information storage memories.

These and other objects of this invention are realized in one illustrative three-dimensional magnetic arrangement for its practice in which the precise time of the arrival of a read-out signal is derived from the read-out information itself. Each of the binary information words stored in the magnetic memory is extended to include one additional bit which serves the function of a reference bit. For each word of the memory this reference bit will always be a binary "1" and, according to one feature of this invention, all of the reference bits are advantageously contained in the storage cores of an additional, or reference coordinate array core plane. Thus, each of the cores of the reference plane will have a "1" therein and will therefore be in a "set" magnetic remanent state in accordance with the usual practice and understanding, no matter what the magnetic state of the remaining cores of the rows may be. Upon the read-out of any particular row, it is clear that the signal generated by the switching of the reference core will arrive at the detection circuitry of the memory at precisely the same time that the simultaneously generated word information signals, if any, arrive there.

According to one feature of this invention, the reference signal thus provided by the interrogation of the reference core of a row is advantageously employed to control the subsequent operation of the read-out detection circuits. As mentioned above, in order to achieve a suitable discrimination between true and spurious read-out signals, it is important that a strobe pulse be generated to occur at substantially the same time that a read-out signal, if any, arrives at the read-out detection circuits. According to the principles of this invention, a strobe pulse generator is triggered by the reference signal and, as a result, the stroke pulse is synchronized to occur at the time that any other read-out signals or absence of such signals indicative of a stored binary word may be expected on the sensing conductors.

It is accordingly a feature of this invention that although varying delays in the appearance of read-out signals in a large scale magnetic memory still exist, novel read-out circuitry is provided so that difficulties occasioned by such delays are advantageously avoided.

It is another feature of this invention that a detection amplifier is provided for each sensing conductor of a three-dimensional memory matrix. Each of the amplifiers is enabled by a strobe pulse generated only responsive to a reference signal read out of the memory simultaneously with the reading out of information signals on the sensing conductors.

Figure 2:
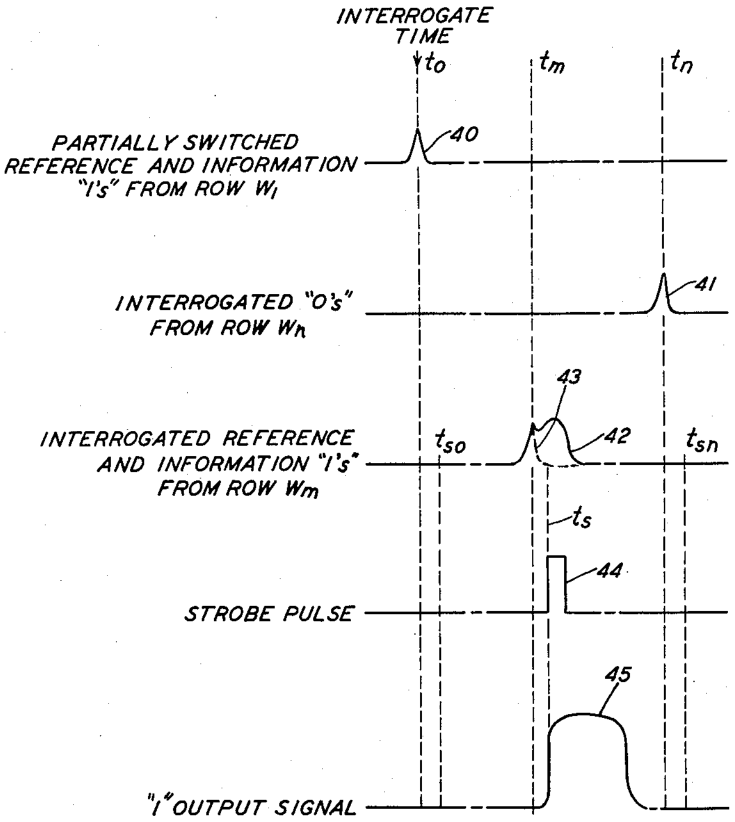

The foregoing and other objects and features of this invention will be better understood from a consideration of a detailed description of one specific illustrative embodiment of this invention which follows when taken in conjunction with the accompanying drawing in which:

FIG. 1 is a block diagram showing in partial detail an illustrative organization of this invention when practiced in conjunction with a representative three-dimensional memory matrix; and FIG. 2 is a comparison chart illustrating by means of idealized waveforms operating pulses at various operative stages of this invention.

An illustrative three-dimensional memory matrix 10 embodying the principles of this invention and shown generally in FIG. 1, comprises a plurality of information planes $\mathbf{20}_1$, $\mathbf{20}_2$, $\mathbf{20}_3$, $\mathbf{20}_4$, . . . $\mathbf{20}_m$, and $\mathbf{20}_n$ and a reference plane 20R. The planes 20 and 20R are depicted generally only in symbolic form with only so much detail as it necessary for a complete understanding of this invention. Each of the planes 20 and 20R comprises a plurality of magnetic toroidal cores 21 which may each be of the well-known type exhibiting substantially rectangular hysteresis characteristics. The cores 21 of each plane are arranged in rows and columns to present a coordinate array so that each core of a plane may be positively defined by a row and column coordinate. In accordance with the well-known organization of coordinate array matrices generally the rows and columns of each of the planes 20 and 20R may be understood as being threaded by coordinate energizing conductors which may include conventional coincident current write conductors. Since a detailed description of the latter conductors is not considered necessary to a complete understanding of this invention, they have been omitted from the drawing to avoid undue complexity.

The planes $\mathbf{20}_1$ through $\mathbf{20}_n$ and 20R are organized so that the cores of each of the planes constitute corresponding bit addresses for the information words across adjacent planes. In this organization a single sensing conductor is associated with each plane and serially threads the cores of the associated plane in one direction along one row, returning in the other direction along the adjacent row of a plane. In this manner, the sensing conductors $\mathbf{22}_1$, $\mathbf{22}_2$, $\mathbf{22}_3$, $\mathbf{22}_4$, . . . $\mathbf{22}_m$, and $\mathbf{22}_n$ thread the cores of the planes $\mathbf{20}_1$ through $\mathbf{20}_n$ respectively. In a similar manner, a sensing conductor 23 threads the cores of the reference plane 20R. Each of the sensing conductors 22 and 23 terminates at one end at a ground bus 24 and at the other end at specific operating circuitry to be described. The sensing conductor 23 is connected at its other end to the input of a strobe pulse generator 25. The latter circuit may be any suitable circuit well known in the art capable of generating an output signal of the character, and responsive to particular input conditions, to be described hereinafter. Each of the sensing conductors 22 is connected at its other end to the input of a read-out detection amplifier 26. Connected to the output end of the strobe pulse generator 25 is a common conductor 27 which is connected in parallel to a control input of each of the read-out detection amplifiers 26. The detection amplifiers 26 may also comprise circuits of a kind readily available to one skilled in the art capable of operating responsive to specific input conditions to be described. The output end of each of the amplifiers 26 is connected to externally associated circuitry designated as information utilization circuits 28 in FIG. 1. Such circuits for the utilization of binary information signals are also known in the art.

A description of the read-out circuitry according to the principles of this invention is completed by a brief consideration of an illustrative word-selecting matrix switch 30 operated in conjunction with the memory matrix 10. The switch 30 comprises a coordinate array of magnetic cores which may also advantageously be of the toroidal square loop type also employed in the memory matrix 10. Each of the rows of cores 31 of the switch 30 has threaded therethrough a row switching conductor 32. Similarly, each of the columns of cores 31 has threaded therethrough a column switching conductor 33. The location of each of the cores 31 is thus positively defined by one of the row conductors 32 and one of the column conductors 33. Each of the row conductors 32 is connected at one end to a row selecting switch 34 and each of the column conductors 33 is connected at one end to a column selecting switch 35. The coordinate array of cores 31 of the matrix switch 30 is arranged to correspond to the coordinate arrays of cores 21 of each of the memory planes $\mathbf{20}_1$ through $\mathbf{20}_n$ and 20R.

The matrix switch 30 is associated with the memory matrix 10 by means of a plurality of interrogating conductors 36 which comprise output conductors for the cores 31 of the switch 30. The conductors 36, after threading respective cores 31 of the switch 30, are extended to also thread each of the corresponding cores 21 of the planes 20 and 20R. The interrogating conductors 36 thus define the information and reference bit addresses making up the binary words stored in the matrix 10. For example, the interrogating conductor $\mathbf{36}_1$ threading the selecting core $\mathbf{31}_1$ also threads each of the cores 21 of the word row $W_1$ of the memory matrix 10, the interrogating conductor $\mathbf{36}_m$ threads each of the cores 21 of the word row $W_m$, and the interrogating conductor $\mathbf{36}_n$ threads each of the cores 21 of the word row $W_n$. The foregoing conductors 36 and word rows W are deemed sufficient to provide a full understanding of this invention. In this connection, it may also be pointed out that only portions of the circuits for interrogation of the matrix 10 and the selection operation of the matrix switch 30 are shown, it further not being considered necessary in every instance to specifically show circuitry not comprising inventive subject matter and which is readily envisioned by one skilled in the art. For this reason also the various circuits comprising elements of the present combination being described, for example, circuits 25, 26, 28, 34, and 35, are shown only in block symbol form.

In accordance with aforedescribed organization of this invention, it is readily apparent from FIG. 1 of the drawing that the first word row $W_1$ is physically disposed most closely to the read-out detection amplifiers 26 along the sensing conductors 22. It will be assumed for purposes of description only that the matrix 10 has a capacity of a million words and, accordingly, the word row $W_n$ would be the millionth word and the farthest in distance from the amplifiers 26. An intermediate word row $W_m$ lies somewhere between the first row $W_1$ and the last row $W_n$ assuming the present threading pattern of the sensing conductors 22 and 23 in the planes 20 and 20R. It will further be assumed for purposes of describing the principles of this invention that the propagation velocity of electrical signals along the sensing conductors 22 and 23 is such that a difference of $n$ microseconds exists in the appearance time of signals originating in the first row $W_1$ and the last row $W_n$. The difference time may thus be arbitrarily selected and may be any value without in any way affecting the operation of the present invention. Thus, factors such as word capacity, inductances and capacitances existing in the core windings, and the like, may determine the particular difference times.

Illustrative operations of this invention may now be described with particular reference to the pulse comparison chart of FIG. 2. An interrogation operation is initiated by the coincident application of selecting current pulses to a selected row and column switching conductors 32 and 33 from the sources 34 and 35, respectively.

The particular row and column conductors selected will determine, in the conventional manner, the particular word of the memory matrix 10 to be interrogated. In describing one origin of spurious read-out signals on the sensing conductors 22, it may be assumed that a partial switching current pulse is applied to the row conductor $\mathbf{32}_1$ of the matrix switch 30. In this connection, no regard will be had to the particular column conductor 33 selected with the exception that it be further assumed that the column conductor $\mathbf{33}_1$ is not selected. It thus follows that the core $\mathbf{31}_1$ was not selected and the word row $W_1$ was not determined for interrogation. Due to the applied partial switching current pulse, however, core $\mathbf{31}_1$ does proceed through a partial excursion along its hysteresis loop and voltage is induced in its threaded interrogation conductor $\mathbf{36}_1$. As a result, a partial switching current is now applied to each of the cores 21 of the word row $W_1$. The core 21 in this row in the reference plane 20R and any other cores 21 in this row in the other planes $\mathbf{20}_1$ through $\mathbf{20}_n$ which was in a set magnetic state representative of a binary "1," will pass through a partial excursion on their hysteresis loops. These flux excursions induce spurious signals represented as the spike 40 in FIG. 2 on the sensing conductors 22 and 23 and arrive at the output ends of the latter conductors at the time $t_0$ which may be regarded as virtually the moment of interrogation. The partial read-out spike 40 appearing on the reference sensing conductor 23 will be insufficient in amplitude to trigger the strobe pulse generator 25. No information signals, or for that matter any spurious signals, will be transmitted to the information utilization circuits 28 in this case.

In another situation, partial selecting current pulses are coincidentally applied to the column selecting conductor $\mathbf{33}_n$ and the row selecting conductor $\mathbf{32}_n$ of the matrix switch 30. The core $\mathbf{31}_n$ is thus positively selected together with its word row $W_n$ of the memory matrix 10. The core $\mathbf{31}_n$, as a result, is completely switched and a full-valued interrogation signal is induced on the interrogating conductor $\mathbf{36}_n$. The set core 21 in the reference plane 20R together with any other set cores of the other planes $\mathbf{20}_1$ through $\mathbf{20}_n$ in the word row $W_n$ representative of binary "1's" will be switched to thereby induce full-valued read-out signals on the associated sensing conductors 23 and 22 of a waveform to be considered hereinafter. Any of the cores 21 not set in the word row $W_n$ and thereby containing binary "0's," will only be driven further into saturation. The latter flux excursion also induces read-out signals in the associated sensing conductors substantially of a waveform of the spike 41 shown in FIG. 2. Since the latter signals originate in the word row $W_n$ farthest removed from the output ends of the sensing conductors 22, it will appear at the output ends at the time $t_n$. The time interval $t_n - t_0$ thus represents the longest delay time in the appearance of read-out signals at the output ends of the sensing conductors 22 encountered in the illustrative memory matrix 10 of FIG. 1. A full-valued reference output signal will, however, appear on the sensing conductor 23 and will trigger the strobe pulse generator 25 at the time $t_n$. The latter circuit generates a strobe pulse which, in cooperation with full-valued read-out signals induced on particular sensing conductors 22, enables the respective read-out detection amplifiers 26 to provide information signals representative of the binary word read out of the row $W_n$ to the information utilization circuits 28. This operation will be described in connection with a final illustrative read-out operation below.

In the foregoing illustrative read-out operations only spurious read-out signals have been considered. In the following illustrative read-out operation, the selection of the word row $W_m$ of the memory matrix 10 and the generation of a binary "1" signal will be assumed. This is accomplished by the selection and switching of the corresponding core 31 of the matrix switch 30 in the manner described for previous illustrative read-out operations. An interrogation signal is induced as a result, on the interrogating conductor $36_m$ threading the cores 21 of the word row $W_m$. The cores 21 of this row in the reference plane 20R and in the remaining planes $20_1$ through $20_n$ which are in a set magnetic state representative of a binary "1," will be switched during interrogation. As a consequence, full-valued read-out voltage signals will be induced on the sensing conductor 23 and the associated sensing conductors 22 at the same time. The reference and information signals representative of binary "1's" which may comprise part of the information word stored in the word row $W_m$ are represented in idealized form by the signal 42 in FIG. 2. These signals are shown to occur at the output ends of the sensing conductors 23 and 22 at the same time $t_m$ which is represented as being intermediate between the zero delay time $t_0$ and the maximum delay time $t_n$. The latter relationship corresponds to the relative physical locations of the word rows $W_1$, $W_m$, and $W_n$ in the memory matrix 10. In this operation, the partial noise signals originating in cores 21 of the word row $W_m$ containing binary "0's" are not considered. However, the latter signals may be understood as having substantially the waveform of the spike 41 shown in FIG. 2 in connection with a previously described operation. This spike occurring as an initial positive-going spike in each binary "1" read-out signal and as a spike as such for each binary "0" read-out signal is depicted within the waveform 42 by the dashed spike 43 in FIG. 2.

The reference signal of the form 42 on the reference sensing conductor 23, as in the case of each of the foregoing operations, is of sufficient magnitude to trigger the strobe pulse generator 25. The latter circuit generates a strobe pulse represented in FIG. 2 by the pulse 44 which is applied to the common conductor 27 to occur sometime after the appearance of any initial spikes 43 on the sensing conductors 22. For optimum signal-to-noise ratio and signal discrimination, the strobe pulse 44 may be timed to occur substantially after the initial spike 43 at a point where the binary "1" signal 42 has built up to its maximum amplitude. This point of time is indicated in FIG. 2 as time $t_s$. The coincidence at the time $t_s$ of a strobe pulse 44 and a true read-out signal 42 at the control inputs of any of the amplifiers 26 will cause the latter circuits to operate. The controls may readily be achieved, for example, by applying the read-out signal 42 to the control grid of a vacuum tube amplifier and causing the strobe pulse 44 to control the plate voltage supply of the same amplifier. Output signals from the read-out detection amplifiers 26 at the time $t_s$, depicted by the waveform 45 in FIG. 2, will be representative of binary "1's" on the sensing conductors 22 and an absence of an output signal from an amplifier 26 at the time $t_s$ is indicative that a binary "0" was stored in a core 21 through which the associated sensing conductor 22 is threaded. The true read-out signal 42 has thus been amplified to more advantageous levels at the same time that a discrimination strobing operation was performed prior to the transmission of the read-out signals to the information utilization circuits 28.

It is apparent from the comparison chart of FIG. 2 and from the foregoing description that the time $t_s$ at which the strobing and amplification of the read-out signals is accomplished is variable and may occur at any time within a range controlled by a signal 42 at the time $t_0$ and such a signal 42 at the time $t_n$. This range is marked off in FIG. 2 by the times $t_{s0}$ and $t_{sn}$. This timing of the strobe pulse 44 is in this manner made a function of the physical location of an interrogated word address in the memory matrix.

After any particular read-out operation, the switched cores 21 in the reference plane 20R may be reset either by independent biasing means known in the art or they may be reset in conjunction with a subsequent write or rewrite operation of the memory matrix 10. Since the write phase of operation of the latter matrix does not constitute an essential aspect of the present invention, the introduction of information bits in the word rows W need not be described herein. Any of the conventional means for accomplishing this phase of operation may be understood as performing this function.

For purposes of describing the principles of this invention an illustrative magnetic memory matrix employing conventional toroidal magnetic cores as basic storage elements was described and shown in the drawing. Further, it was assumed that the amplitude of the voltage signals induced by interrogated storage cores was the basis for distinguishing between a binary "1" signal and a binary "0" signal. A full-valued signal such as the signal 42 in FIG. 2 represented a binary "1" and a noise signal such as the spike 41 of the same figure indicated the presence of a binary "0." It is to be understood, however, that the principles of this invention may be practiced with equal advantage in memory matrices employing other and different magnetic devices as basic storage elements and in which the distinction between the information values is differently manifested. Thus, for example, a read-out organization according to this invention is also ideally suited to a memory matrix employing a magnetic memory wire as basic storage element. Such a matrix and storage element are described in the copending application of A. H. Bobeck, Serial No. 675,522, filed August 1, 1957. Since the sensing means may be arranged in a memory matrix such as there described in a manner similar to that described in the foregoing embodiment, read-out means according to this invention may be there used with equal facility.

In a magnetic wire memory matrix of the character described in the last-mentioned copending application, it may become advantageous to perform the word interrogation operation by means of an applied alternating current rather than a single switching current pulse. In such a read-out arrangement a phase difference manifests the distinction between a binary "1" and a binary "0" read-out. It is still important, however, that a strobing current, which may in this case also be an alternating current, also occur in the same phase as the output signals on the sensing conductors. Such induced information signals would also be delayed in a large scale memory for the same reasons considered in connection with the specific embodiment described hereinbefore. It is readily apparent that by providing a reference plane in accordance with this invention, the strobing signal generator may be timed to operate at the precise time that particular word information signals appear at the output ends of the sensing conductor means.

Thus, it is to be understood that what has been specifically described is considered to be only one illustrative embodiment of the present invention. Accordingly, various and numerous other arrangements may be devised by one skilled in the art without departing from the spirit and scope of this invention.

What is claimed is:

1. An information storage matrix comprising a plurality of information storage devices, a reference storage device, a plurality of information sensing conductors associated respectively with said information storage devices, a reference sensing conductor associated with said reference storage device, read-out means for inducing read-out signals on said information and reference sensing conductors representative of the operative state of each of said information and reference storage devices, respectively, a strobe pulse generator operated responsive to a read-out signal on said reference sensing conductor for generating a strobe signal, and gating means operated responsive only to the coincidence of said strobe signal and said read-out signals on said information sensing conductors for generating output signals indicative of said operative states of said information storage devices.

2. An information storage matrix comprising a plurality of information magnetic storage elements, a reference magnetic storage element, each of said information and reference storage elements being capable of assuming stable remanence states representative of particular information values, a plurality of information sensing conductors coupled respectively to said information storage elements and energizable responsive to the switching of said last-mentioned elements from a particular remanence state to another for providing information read-out signals, a reference sensing conductor coupled to said reference storage element and energizable responsive to the switching of said last-mentioned element from said particular remanence state to said other state for providing a reference read-out signal, a strobe pulse generator energized responsive to said reference read-out signal for generating a strobe signal, a plurality of gating means associated respectively with said plurality of information sensing conductors, and circuit means for applying said strobe signal to each of said gating means, each of said gating means being responsive only to the coincidence of said strobe signal and said information read-out signals on said information sensing conductors to provide output signals indicative of said particular remanence states of said information storage elements.

3. An information storage matrix according to claim 2 in which said plurality of gating means comprises respectively a plurality of amplifying means.

4. An information storage matrix comprising a plurality of information planes and a reference plane, each of said planes comprising a coordinate array of corresponding magnetic storage elements, each of said elements being capable of assuming stable remanence states representative of particular information values, a reference sensing conductor serially inductively coupled to the storage elements of the coordinate array of said reference plane, a plurality of information sensing conductors serially inductively coupled to the storage elements of the coordinate arrays of said information planes, respectively, said reference and sensing conductors having read-out signals induced thereon responsive to the switching of particular elements in each of said reference and information planes from a particular remanence state to another, a strobe pulse generator energized responsive to a read-out signal on said reference sensing conductor for generating a strobe signal, a plurality of gating means each having a pair of inputs, and means for connecting said strobe pulse generator to one input of each of said gating means, the other input of each of said gating means being connected respectively to said plurality of information sensing conductors, said plurality of gating means being severally enabled by the coincidence of said strobe pulse and read-out signals on said connected information sensing conductors to provide output signals indicative of said particular remanence states of said particular storage elements.

5. An information storage matrix according to claim 4 in which each of said gating means comprises an amplifier means.

6. An information storage matrix according to claim 4 in which each of the magnetic storage elements of said coordinate arrays of said reference and information planes comprises a toroidal magnetic core.

7. An information storage arrangement comprising a plurality of magnetic storage elements including a reference storage element, each of said elements being capable of storing a first and a second binary value in the form of one or the other stable remanence state, said reference element having a first binary value stored therein, a sensing conductor inductively coupled to each element of said plurality of storage elements, read-out means for simultaneously switching the remanence state of each of said elements having said first binary value stored therein to thereby induce read-out signals in said coupled sensing conductors, a strobe pulse generator connected to the sensing conductor coupled to said reference storage element energized responsive to the read-out signal induced in said last mentioned conductor for generating a strobe signal, a plurality of amplifier means associated respectively with said plurality of sensing conductors except the sensing conductor coupled to said reference storage element, and means for exclusively energizing each of said amplifier means comprising circuit means for applying said strobe signal to one control input of each of said amplifiers and means for severally applying said read-out signals induced in the sensing conductors coupled to said switching elements of said plurality of elements to another control input of each of said associated amplifier means.

8. In combination, a memory matrix means for storing a plurality of information words, each word comprising a predetermined combination of binary characters, said matrix means having a plurality of information sensing conductors associated respectively with corresponding information character addresses of each of said words, particular ones of said information sensing conductors being energized during the read-out of a particular word from said matrix means to provide information read-out signals when the associated character addresses of said particular word each contain a particular one of said binary characters, a reference information address means containing said particular one of said binary characters, a reference sensing conductor associated with said reference address means energized during said read-out of said particular word to provide a reference read-out signal, a strobe pulse generator energized responsive to said reference read-out signal for generating a strobe signal, gating means connected to each of said particular ones of said information sensing conductors, and means for enabling said gating means comprising circuit means for applying said strobe signal to each of said gating means.

9. The combination as claimed in claim 8 in which each of said gating means comprises an amplifier means energized responsive to the coincidence of said strobe signal and an information read-out signal indicative of said particular one of said binary characters.

10. In combination, a memory matrix means for storing binary "1's" and "0's" arranged in information words, said matrix means having a plurality of information sensing conductors energized during read out to provide information read-out signals representative of the binary "1's" of a particular word, a reference matrix for storing a binary "1" for each word of said memory matrix means, said reference matrix having a reference sensing conductor energized during said read out to provide a reference read-out signal, a strobe pulse generator energized responsive to said reference read-out signal for generating a strobe signal, a plurality of amplifier-gating means connected respectively to said information sensing conductors and to said strobe generator, each of said amplifier-gating means energized responsive to the coincidence of said strobe signal and said information read-out signals to provide output signal conditions indicative of the binary "1's" and "0's" of said particular word.

11. The combination as claimed in claim 10 in which said memory matrix means comprises coordinate arrays of toroidal magnetic cores, each being capable of storing a binary value in one or the other state of remanent magnetization.

12. The combination as claimed in claim 11 in which said reference matrix also comprises a coordinate array of said toroidal magnetic cores.

13. An information storage arrangement comprising memory means having a first information storage element at a first information address therein and a second information storage element at a second information address therein, an information sensing conductor serially associated with each of said information addresses, and means for strobing read-out signals appearing on an output end of said information sensing conductor originating at said first information address at a first time and originating at said second information address at a second time comprising a first reference storage element at a first reference address corresponding to said first information address and a second reference storage element at a second reference address corresponding to said second information address, each of said reference storage elements having a particular binary value stored therein, a reference sensing conductor serially associated with each of said reference addresses, said reference sensing conductor being energized during read out at said first time and at said second time to provide a reference read-out signal at each of said times indicative of said particular binary values, a strobe pulse generator energized responsive to said reference read-out signals for generating a strobe signal at each of said times, and gating means connected to the output end of said information sensing conductor enabled responsive to said strobe signal for gating only read-out signals representative of said particular binary value.

14. An information storage arrangement comprising a memory matrix for storing a plurality of binary words, each of said words including a reference bit and a plurality of information bits, said reference bit being a binary "1," a plurality of information sensing conductors for sensing corresponding information bits of said words, a reference sensing conductor for sensing corresponding reference bits of said words, read-out means for simultaneously inducing read-out signals on each of said reference and information sensing conductors representative of binary "1's" of a selected word of said matrix, a strobe signal generator energized responsive to the read-out signal on said reference sensing conductor for generating a strobe signal, a plurality of amplifier-gating means connected respectively to said information sensing conductors, and circuit means for applying said strobe signal to each of said amplifier-gating means each of said amplifier-gating means being energizable responsive to the coincident application of said strobe signal and a read-out signal representative of a binary "1" on the connected information sensing conductor for generating an amplified output signal also representative of said last-mentioned binary "1."

15. A magnetic memory matrix comprising a plurality of information word storage means each comprising a plurality of magnetic means for storing a plurality of information bits and a reference bit in the form of a particular remanent flux state, a plurality of sensing conductor means associated respectively with corresponding magnetic means of said plurality of word storage means, means for simultaneously switching said particular remanent flux states in a selected one of said word storage means to generate information read-out signals and a reference read-out signal on said sensing conductor means, means responsive to said reference read-out signal for generating a strobe signal, and means responsive to said strobe signal for strobing said information read-out signals.

No references cited.